United States Patent [19]
Anderson

[11] Patent Number: 5,927,937
[45] Date of Patent: Jul. 27, 1999

[54] AUTOMATED STACKING APPARATUS

[76] Inventor: Edward E. Anderson, Rte. 4, Box 972, Salem, Mo. 65560

[21] Appl. No.: 08/936,934

[22] Filed: Sep. 25, 1997

[51] Int. Cl.⁶ ................................................ B65G 57/03
[52] U.S. Cl. ..................... 414/792.9; 901/49; 414/744.3; 414/788.6; 414/792.4
[58] Field of Search ............................. 414/744.3, 788.6, 414/792, 792.4, 792.8, 792.9; 901/49

[56] References Cited

U.S. PATENT DOCUMENTS

| | | | |
|---|---|---|---|
| 4,344,729 | 8/1982 | Orsinger et al. | 901/49 |
| 4,504,186 | 3/1985 | Richards | 414/744.3 |
| 4,978,274 | 12/1990 | De Groot | 414/744.3 |
| 5,755,550 | 5/1998 | Brandt et al. | 414/744.3 |

FOREIGN PATENT DOCUMENTS

| | | | |
|---|---|---|---|
| 1255075 | 11/1967 | Germany | 414/744.3 |
| 70621 | 3/1990 | Japan | 414/744.3 |
| 1548038 | 3/1990 | U.S.S.R. | 414/744.3 |

*Primary Examiner*—Janice L. Krizek
*Assistant Examiner*—Gregory A. Morse
*Attorney, Agent, or Firm*—Hovey, Williams, Timmons & Collins

[57] ABSTRACT

A stacker (10) for picking up objects (12) from a first location (14) and stacking the objects at a second location (16) is disclosed. The stacker (10) includes a vertically extending support column (18), a swing arm (20) pivotally mounted to the support column about a vertical axis, and a pick-up head (22) suspended from the end of the swing arm. The support column (18) includes a stationary inner boom (24) configured for attachment to a floor or support base, an outer boom (28) telescopically received over the inner boom, and a hydraulic cylinder (30) for raising and lowering the outer boom relative to the inner boom. The swing arm (20) is coupled with the outer boom (28) so that the swing arm and pick-up head (22) are raised and lowered by the hydraulic cylinder (30).

21 Claims, 4 Drawing Sheets

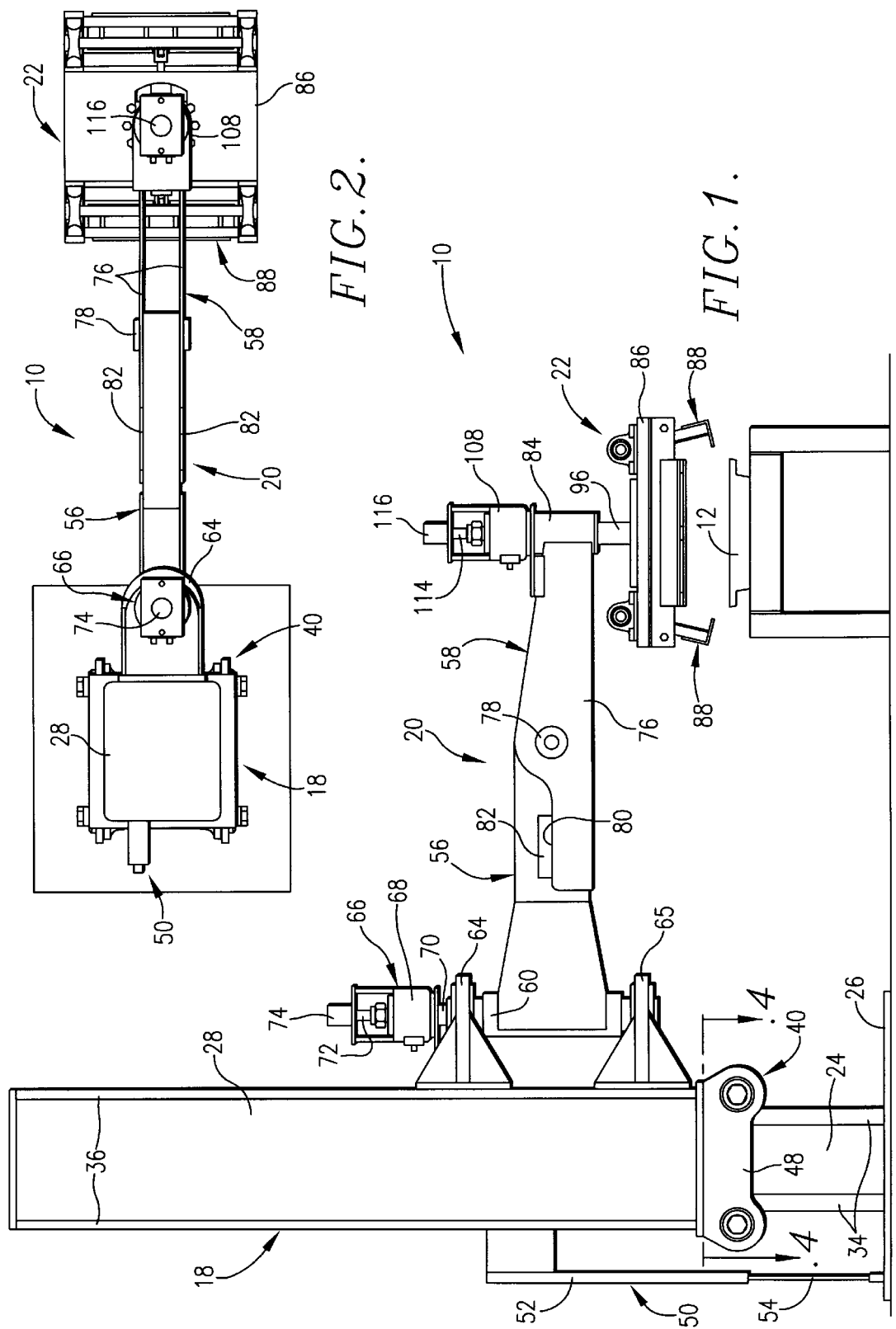

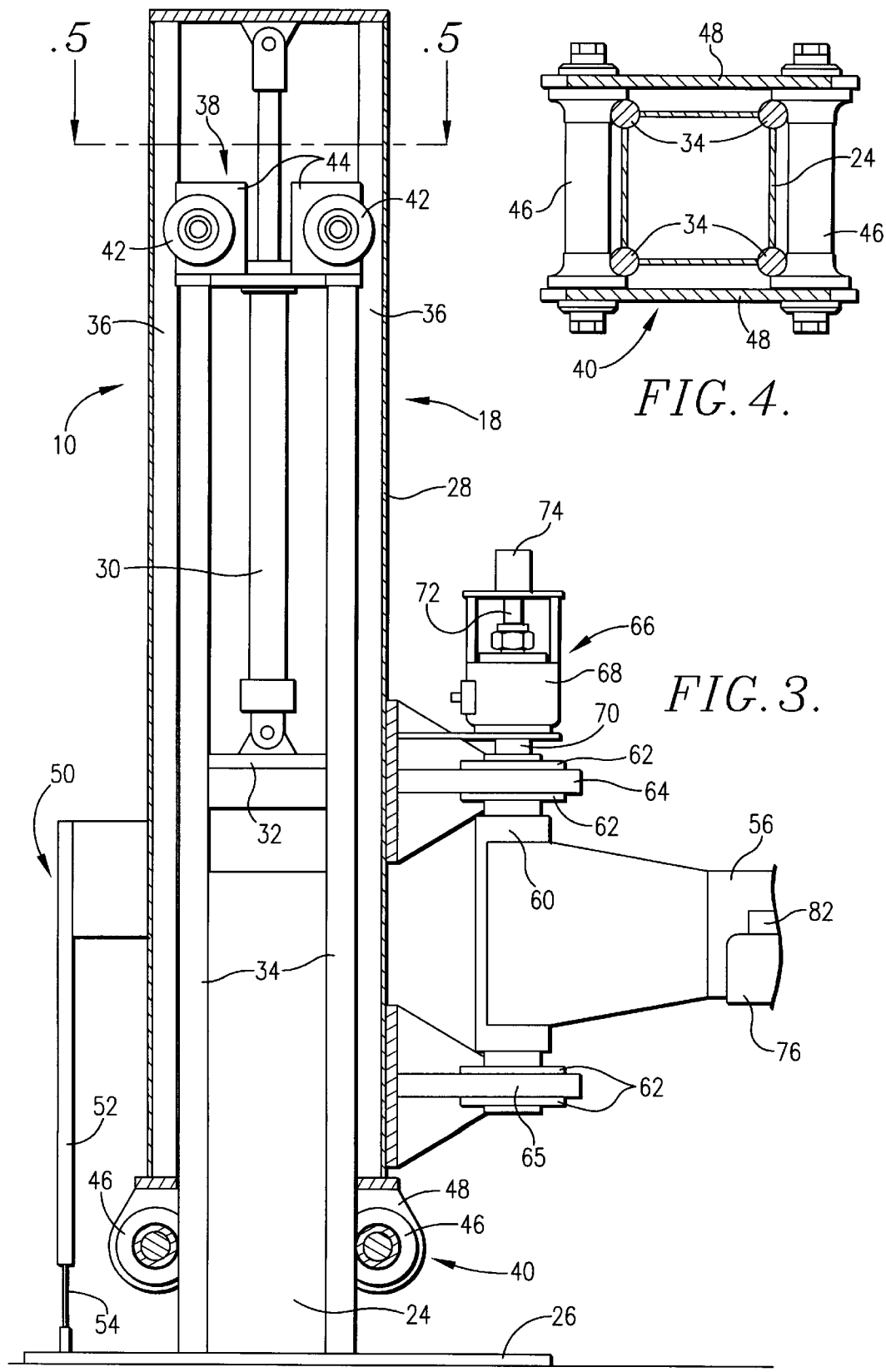

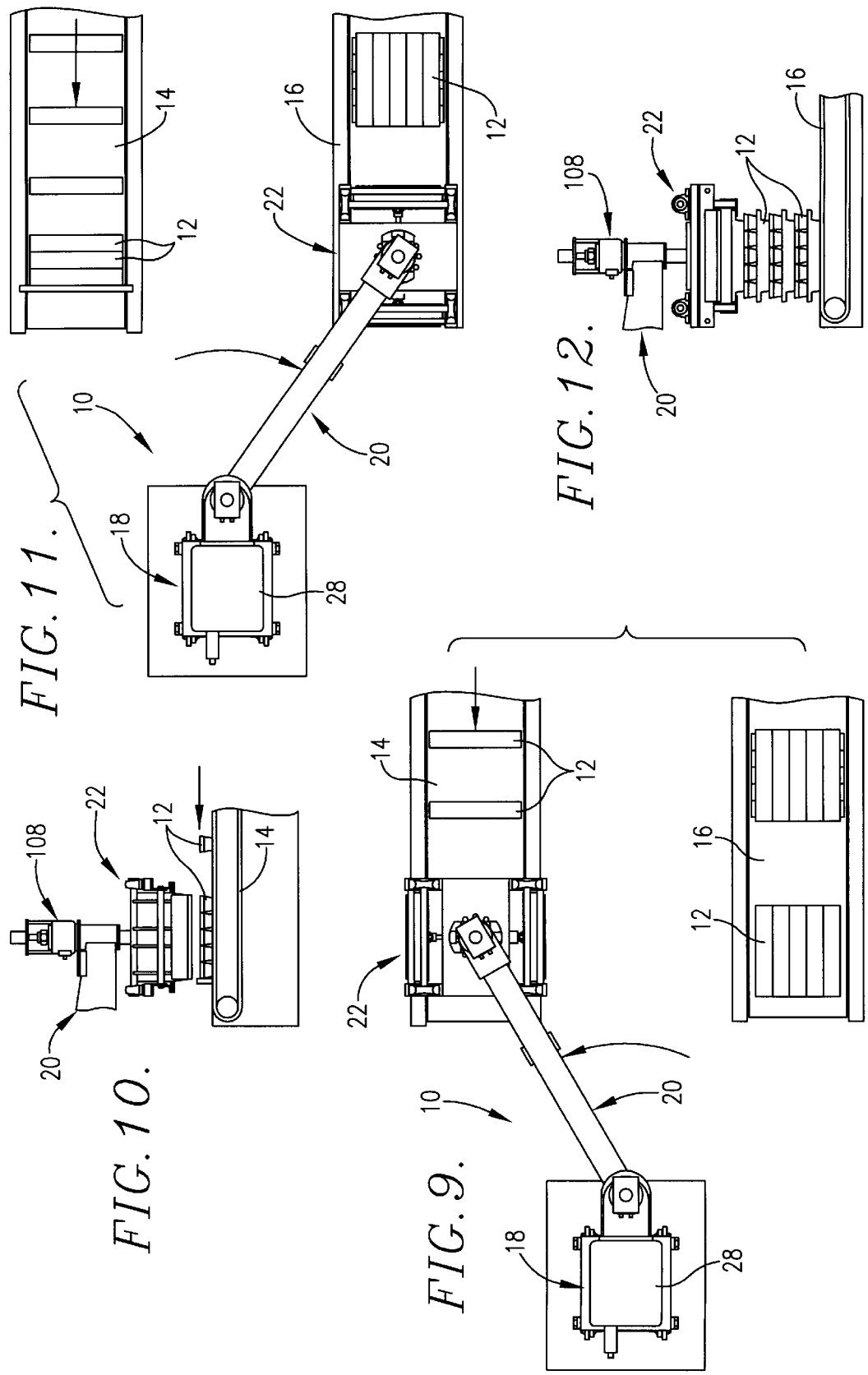

AUTOMATED STACKING APPARATUS

BACKGROUND OF THE INVENTION

1. Field of the Invention

The present invention relates to automated stackers for picking up and stacking objects for transport or further processing. More particularly, the invention relates to such a stacker that is not supported from an overhead track assembly and that can pick up and stack objects in various locations without repositioning the entire stacker.

2. Description of the Prior Art

Many industrial operations require that objects be picked up from one location, transported to another location, and then stacked for shipping or further processing. For example, lead and aluminum bars are typically conveyed to a pick-up point after manufacture. The bars are then picked up, transported to another location such as a second conveyor or pallet, and stacked in layers for shipping.

Such stacking operations are typically performed either manually or with automated stackers. Manual stacking requires a great deal of labor and is impractical for large, heavy objects such as lead bars.

Known prior art automated stackers include pick-up heads suspended from overhead track assemblies that are suspended from the ceilings of buildings. Unfortunately, these overhead track assemblies are costly to manufacture and install. Moreover, the fixed mounting of the track assemblies necessitates that the objects be picked up from and stacked in set locations accessible from the tracks. If it is desired to pick up the objects from or stack the objects in locations that are not accessible from the tracks, the tracks must be taken down and repositioned.

OBJECTS AND SUMMARY OF THE INVENTION

In view of the foregoing, it is an object of the present invention to provide an improved stacker that does not suffer from the limitations of prior art stackers set forth above.

It is a more particular object of the present invention to provide a stacker that does not require the use of fixed, overhead track assemblies.

It is another object of the present invention to provide a stacker that can pick up and stack objects in various locations without repositioning the entire stacker.

The present invention achieves these objects and other objects that become evident from the description of the preferred embodiments of the invention herein by providing an improved automated stacker. The stacker of the present invention broadly includes a vertically extending support column, a horizontally extending swing arm pivotally mounted to the support column about a vertical axis adjacent the support column, and a pick-up head suspended from the distal end of the swing arm.

The support column preferably includes a stationary, inner boom and vertically moveable outer boom telescopically mounted over the inner boom. The stacker also includes a hydraulic cylinder for raising and lowering the outer boom and a rotary actuator for swinging the swing arm and pick-up head relative to the support column.

In operation, the stacker picks up objects such as lead bars from a first location and then stacks the bars in layers at a second location. Initially, the swing arm and pick-up head are pivoted or swung so that the pick-up head is positioned over the objects to be picked up and then lowered so that the pick-up head can pick up the objects. Then, the outer boom is raised, the swing arm and pick-up head are swung so that the pick-up head is above the second location, and the outer boom is lowered so that the pick-up head can stack the objects in the second location. The outer boom is then raised and the swing arm and pick-up head are swung back to the first position to perform another stacking operation.

Since the pick-up head is suspended from the pivotal swing arm rather than being suspended from an overhead track, it can be swung about an arc spanning nearly 360°. Thus, the pick-up head can pick up objects from and stack objects at any position along the arc without repositioning the entire stacker.

BRIEF DESCRIPTION OF THE DRAWING FIGURES

A preferred embodiment of the present invention is described in detail below with reference to the attached drawing figures, wherein:

FIG. 1 is a side elevational view of a stacker constructed in accordance with a preferred embodiment of the present invention;

FIG. 2 is a top view of the stacker;

FIG. 3 is a partial side elevational view of the stacker with the vertical support column in vertical section to illustrate the internal components of the vertical support column;

FIG. 4 is a horizontal section view taken along line 4—4 of FIG. 1;

FIG. 9 is a top schematic view of the stacker illustrating the picking up of bars from a first conveyor;

FIG. 10 is a side schematic view of the pick-up head while it is in the position illustrated in FIG. 9 and illustrating the picking up of the bars from the first conveyor;

FIG. 11 is a top schematic view of the stacker illustrating the transport and stacking of the bars on a second conveyor; and FIG. 12 is a side schematic view of the pick-up head while it is in the position illustrated in FIG. 11 and illustrating the stacking of the bars on a second conveyor.

DETAILED DESCRIPTION OF THE PREFERRED EMBODIMENTS

Figure 5:
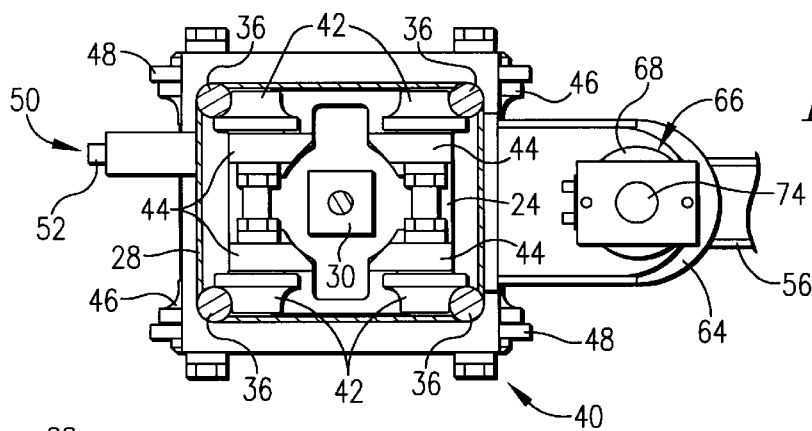
FIG. 5 is a horizontal section view taken along line 5—5 of FIG. 3.

FIG. 1 illustrates a stacker 10 constructed in accordance with a preferred embodiment of the invention. As best illustrated in FIGS. 9 and 11, the stacker 10 is configured for picking up objects 12 such as lead bars from a first location such as a conveyor 14, transporting the objects to a second location such as a conveyor 16, and stacking the objects in layers on the conveyor 16 for shipping or further processing.

The stacker 10 broadly includes a vertically extending support column 18, a horizontally extending swing arm 20 pivotally mounted to the support column about a vertical axis, and a pick-up head 22 pivotally suspended from the end of the swing arm. The preferred stacker 10 also includes hydraulic apparatus described below, a hydraulic controller (not shown) for controlling the delivery of hydraulic fluid to the hydraulic apparatus, and a programmable controller (not shown) for controlling the operation of the hydraulic controller.

As best illustrated in FIG. 3, the support column 18 preferably includes an inner stationary boom 24 configured for attachment to a floor or support base 26, an outer boom 28 telescopically received over the inner boom, and a hydraulic cylinder 30 for raising and lowering the outer boom relative to the inner boom. The inner and outer booms 24,28 are preferably formed of steel and are hollow and rectangular in cross section. The inner boom 24 has an interior, horizontally extending support shelf 32 positioned near its mid-section.

The inner boom 24 also includes four elongated circular rods 34 or bars each mounted to one of its exterior corners (FIG. 4). Similarly, the outer boom 28 includes four elongated rods 36 or bars each mounted to one of its interior corners (FIG. 5). The rods 34,36 serve as guide rails for guiding the vertical raising and lowering of the outer boom 28 as described in more detail below.

The support column 18 also includes upper and lower roller assemblies 38,40 for engaging the rods 34,36. The upper roller assembly 38 is attached to the upper end of the inner boom 24 for riding along the rods 36 on the interior corners of the outer boom 28. The upper roller assembly 38 preferably includes four wheels 42 each rotatably mounted to a vertically extending post 44 extending upwardly from one of the upper corners of the inner boom 24 (FIG. 5). In preferred forms, the wheels 42 on one side of the inner boom 24 are mounted on eccentric axles so that the spacing between of the wheels can be slightly adjusted to properly align the wheels on the rods 36 on the interior corners of the outer boom 28.

The lower roller assembly 40 is attached to the lower end of the outer boom 28 for riding along the rods 34 on the exterior corners of the inner boom 24. The lower roller assembly 40 preferably includes a pair of horizontally-extending roller bars 46 rotatably mounted between a pair of mounting plates 48 depending from opposite sides of the lower end of the outer boom 28 (FIG. 4). In preferred forms, one of the roller bars 46 is mounted on an eccentric axle so that the spacing between the roller bars can be slightly adjusted to properly align the roller bars on the rods 34 on the exterior corners of the inner boom 24.

The hydraulic cylinder 30 is operably coupled between the inner and outer booms 24,28 for raising and lowering the outer boom. Specifically, the cylinder or housing of the hydraulic cylinder 30 is pivotally mounted to the support shelf 32 of the inner boom 24, and the rod or piston is pivotally mounted to the inside face of the upper wall of the outer boom 28. The hydraulic cylinder 30 is operably coupled with the hydraulic controller for controlling the delivery of hydraulic fluid to the cylinder for controlling the raising and lowering of the outer boom 28.

The support column 18 also includes a linear transducer 50 for sensing the vertical position of the outer boom 28. The linear transducer 50 is conventional and includes a housing 52 and a conductive rod or wire 54 telescopically received within the housing. Either the housing 52 or wire 54 is attached to the outer boom 28, and the other is attached to the floor or support base 26. When the outer boom 28 is raised relative to the inner boom 24, the wire 54 is pulled out of its housing 52. The linear transducer 50 then generates an electrical signal proportional to the vertical position of the outer boom 28. This electrical signal is delivered to the programmable controller for controlling the operation of the stacker 10 as described below.

As best illustrated in FIGS. 1 and 2, the swing arm 20 preferably includes an inner arm section 56 and an outer, breakaway arm section 58. The inner arm section 56 includes a vertically extending shaft 60 (FIG. 3)or sleeve that is journaled by bearings 62 between a pair of horizontal, vertically spaced apart mounting plates 64,65 fixed to the exterior of the outer boom 28. Thus, the swing arm 20 is pivotally mounted about a vertical axis defined by the shaft 60. Because the shaft 60 is spaced from the support column 18, the swing arm can be pivoted about an arc spanning nearly 360° as illustrated in FIGS. 9 and 11.

The stacker 10 also includes a hydraulic rotary actuator 66 mounted to the upper mounting plate 64 for pivoting the swing arm 20. The rotary actuator 66 has a stationary cylinder or housing 68 coupled with the hydraulic controller and a rotatable shaft 70 depending from the housing. The actuator shaft 70 is keyed or otherwise coupled to the shaft 60 of the inner arm section 56 for pivoting the swing arm 20. One commercially available rotary actuator that may be used in the present invention is the HS Model actuator manufactured by the Micro-Procession Textron Corporation of Berne, Ind. and sold under the tradenames "Rotac" and "Hyd-ro-ac".

The actuator shaft 70 is also coupled to a shaft coupler 72 that extends upwardly from the actuator housing 68. The shaft coupler 72 is in turn connected with a rotary transducer 74 that senses the rotational position of the actuator shaft 70 and swing arm 20 and generates a proportional electrical signal. This proportional signal is delivered to the programmable controller for use in controlling the operation of the rotary actuator 66 as described below.

Returning to FIGS. 1 and 2, the outer arm section 58 includes a pair of spaced-apart vertically extending plates 76 pivotally mounted to the end of the inner arm section 56 by a pair of horizontal pivot bearings 78. The upper edge of each plate 76 is curved and tapers inwardly toward the inner arm section 56 to form a flat ledge 80. The ledges 80 normally rest under a pair of corresponding stops 82 mounted to the sides of the inner arm section 56. The end of the outer arm section 58 includes a hollow, vertically extending tubular sleeve 84.

The pivotal mounting of the outer arm section 58 prevents damage to the pick-up head 22 and swing arm 20 whenever the pick-up head is inadvertently dropped. During normal operation of the stacker 10, the ledges 80 rest under the stops 82 so that the inner and outer arm sections 56,58 are both substantially parallel with the floor. However, if the swing arm 20 and pick-up head 22 are lowered too far so that the pick-up head strikes the floor or an object on the floor, the outer arm section 58 pivots counterclockwise about the pivot bearings 78 as viewed from FIG. 1 so that the pick-up head is not damaged.

To further prevent damage to the pick-up head 22, the stacker 10 includes a pressure transducer (not shown) operably coupled with the hydraulic cylinder 30 for monitoring the hydraulic pressure in the cylinder during lowering of the outer boom 28. If the swing arm 20 or pick-up head 22 strikes an object while the outer boom 28 is being lowered, the hydraulic pressure in the cylinder 30 will drop. The pressure transducer senses this pressure drop and generates a proportional electric signal. This proportional signal is delivered to the programmable controller, which then signals the hydraulic controller to stop or extend the hydraulic cylinder 30 to stop or raise the outer boom 28.

Figure 7:
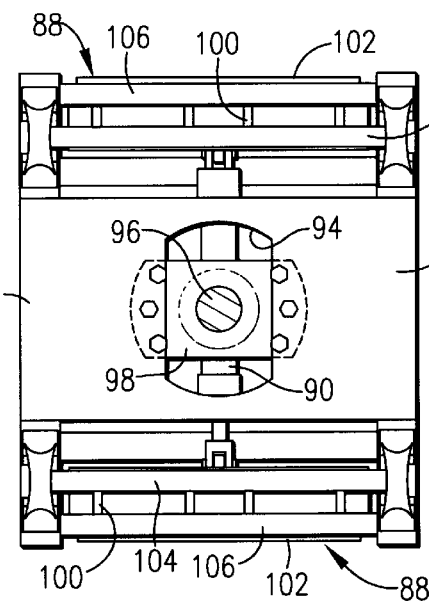
FIG. 7 is a top view of the pick-up head taken along line 7—7 of FIG. 6.
Figure 8:
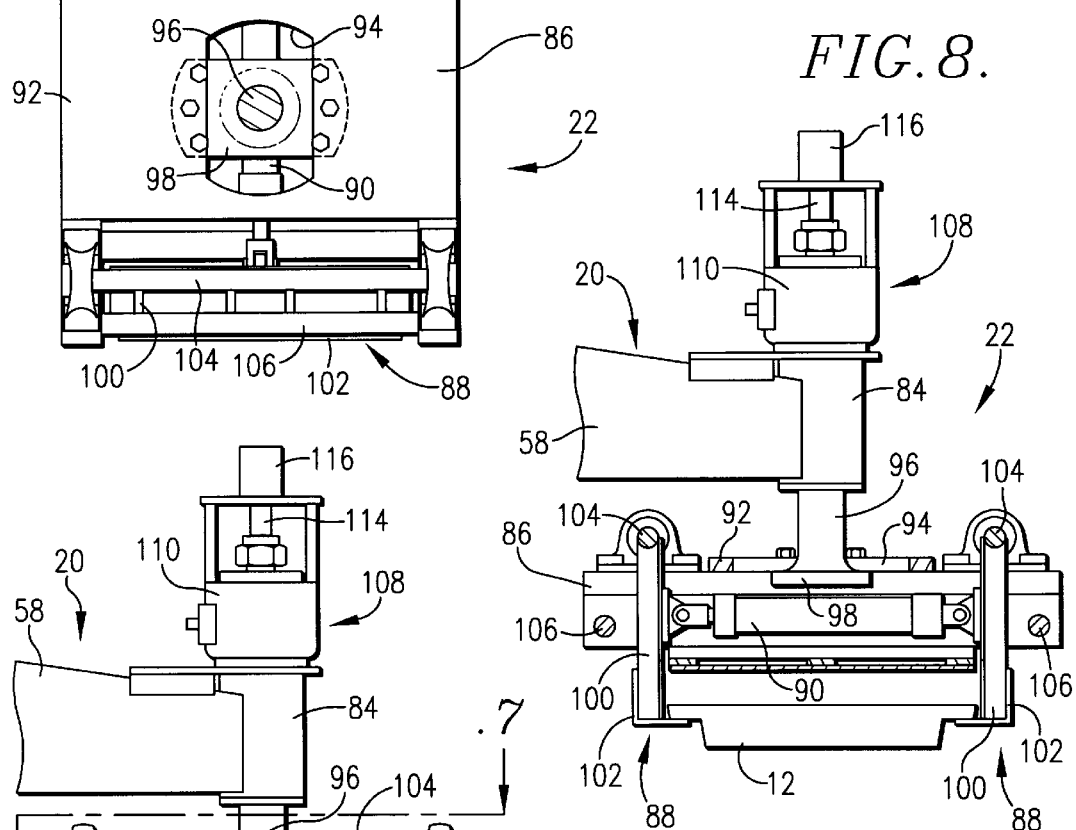
FIG. 8 is a partial side elevational view of the swing arm and pick-up head with the pick-up head in vertical section.
Figure 6:
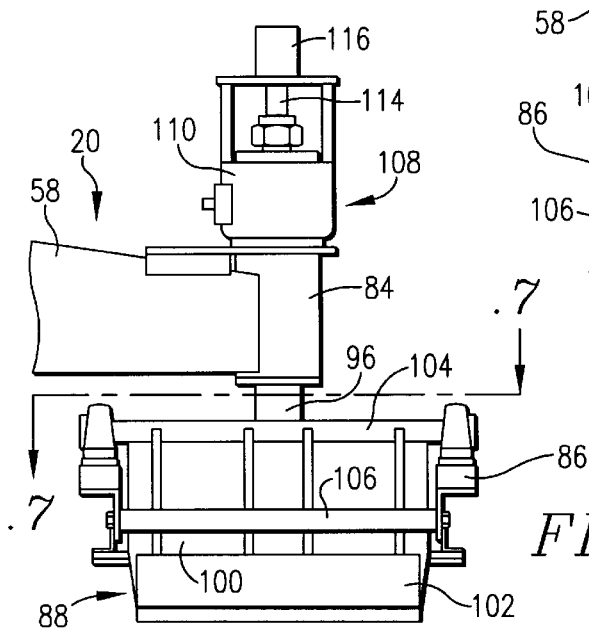
FIG. 6 is a partial side elevational view of the pick-up head of the stacker.

As best illustrated in FIGS. 1, 6 and 8, the pick-up head 22 is suspended from the end of the swing arm 20 and includes a horizontally extending frame 86, a pair of spaced apart jaws 88 depending from the frame, and a hydraulic cylinder 90 for opening and closing the jaws. As best illustrated in FIG. 7, the upper plate 92 of the frame 86 has a mounting aperture 94 therein.

The frame 86 is suspended from the end of the swing arm 20 by a vertical shaft 96 journaled in the sleeve 84 of the outer arm section 58. The lower end of the shaft 96 includes a mounting head 98 that fits within the mounting aperture 94 on the frame 86.

To connect the pick-up head 22 to the swing arm 20, the swing arm is lowered so that the mounting head 98 is inserted through the mounting aperture 94. The shaft 96 and mounting head 98 are then pivoted 90°, and the mounting head is bolted or otherwise attached to the upper plate 92 of the frame 86. This procedure, which can be reversed to remove the pick-up head 22 from the swing arm 20, permits the pick-up head to be easily removed and replaced with another pick-up head to allow different types of objects to be picked up and stacked or to repair the pick-up head.

As best illustrated in FIG. 8, the jaws 88 each include a vertical plate 100 depending from one side of the frame 86 and an L-shaped platform 102 fixed to the lower end of the vertical plate. The vertical plates 100 are pivotally connected to opposite sides of the frame 86 by horizontally extending pivot shafts 104 that are journaled to the upper plate 92 of the frame.

The hydraulic cylinder 90 is operably coupled between the jaws 88 to shift the jaws between a retracted, closed position illustrated in FIG. 8. and an extended, open position illustrated in FIG. 1. The hydraulic cylinder 90 is coupled with the hydraulic controller described above. A pair of horizontally extending bars 106 are suspended from opposite sides of the frame 86 outboard of the jaws 88. The bars 106 serve as stops to limit the outward travel of the jaws 88.

The stacker 10 also includes a rotary actuator 108 mounted to the outer end of the swing arm 20 for rotating or pivoting the pick-up head 22. The rotary actuator 108, which is similar or identical to the rotary actuator 66 coupled with the swing arm 20, has a stationary cylinder or housing 110 and a rotatable shaft (not shown) depending therefrom. The actuator shaft is keyed or otherwise coupled to the shaft 96 supporting the pick-up head 22.

The actuator shaft is also coupled to a shaft coupler 114 that extends upwardly from the actuator housing 110. The shaft coupler 114 is in turn connected with a rotary transducer 116 that senses the rotational position of the actuator shaft and generates a proportional electrical signal. This proportional signal is delivered to the controller for use in controlling the operation of the rotary actuator as described below.

The hydraulic controller is coupled with the hydraulic cylinder 30 of the support column 18, the rotary actuator 66 on the swing arm 20, the rotary actuator 108 on the pick-up head 22, and the hydraulic cylinder 90 between the jaws 88 for controlling the delivery of hydraulic fluid to these components. The hydraulic controller preferably includes a hydraulic pump and electric valve structure.

The programmable controller is electrically coupled with the linear transducer 50, rotary transducers 74,116, and pressure transducer for receiving the proportional electric signals from these devices. The programmable controller is also coupled with the hydraulic controller for controlling the operation of the hydraulic pump as well as the opening and closing of the hydraulic valves. The preferred programmable controller includes a programmable logic controller (PLC) that can be programmed for automating the operation of the stacker components as well as manual controls for manually controlling the stacker 10.

The operation of the stacker 10 is best understood with reference to FIGS. 9–12. The stacker 10 is shown in these figures picking up bars 12 from a first conveyor 14 and transporting and stacking the bars on a second conveyor 16. However, the stacker 10 may be used to pick up any types of objects and stack the objects anywhere within the travel of the swing arm 20.

Initially, the hydraulic cylinder 30 lifts the outer boom 28 and the rotary actuator 66 pivots the swing arm 20 so that the pick-up head 22 is positioned over a layer of bars 12 on the first conveyor 14 as illustrated in FIG. 9. The rotary actuator 108 then pivots the pick-up head 22 to the position illustrated in FIG. 10 so that the jaws 88 are positioned above the protruding edges on the bars 12, and the hydraulic cylinder 90 shifts the jaws to their extended, open position.

The hydraulic cylinder 30 then lowers the outer boom 28 so that the pick-up head 22 is positioned immediately over the layer of bars 12 to be picked up and the jaws 88 are on either side of the bars. The hydraulic cylinder 90 then retracts or closes the jaws 88 so that the L-shaped platforms 102 of the jaws slide under the protruding edges of the bars 12.

The hydraulic cylinder 30 then raises the outer boom 28 so that the pick-up head 22 and the picked up bars clear the first conveyor 14. The rotary actuator 66 then pivots the swing arm 20 and pick-up head 22 towards the second conveyor 16 as depicted in FIG. 11. Once the pick-up head 22 is above the second conveyor 16, the hydraulic cylinder 30 lowers the outer boom 28 until the pick-up head 22 places the layer of lead bars on top of the second conveyor 16 or on top of the previously stacked layer of bars.

The hydraulic cylinder 90 then extends or opens the pick-up head jaws 88, and the hydraulic cylinder 30 raises the outer boom 28 so that the now empty pick-up head 22 clears the second conveyor 16. Finally, the rotary actuator 66 swings the swing arm 20 and pick-up head 22 back to their starting position illustrated in FIG. 9 to perform another pick up operation.

Advantageously, the PLC of the programmable controller is programmed so that the rotary actuator 108 pivots the pick-up head 22 90° during alternate stacking operations. This stacks adjacent layers of bars in opposite directions to improve the stability of the overall stack as illustrated in FIG. 12.

The PLC is also programmed so that the hydraulic cylinder 30 raises and lowers the outer boom 28 only as much as necessary. For example, before the first layer of bars is stacked on the second conveyor 16, the hydraulic cylinder 30 only raises the outer boom 28 a few inches to clear the first and second conveyors 14,16 during swinging motion of the swing arm 20. Then, once a first layer of bars has been stacked on the second conveyor 16, the hydraulic cylinder 30 raises the outer boom 28 an additional amount to clear this additional height. During subsequent stacking of layers on the second conveyor 16, the PLC counts the number of layers stacked on the second conveyor and raises the outer boom 28 to a height sufficient to clear the stacked layers, but no more. This reduces the energy and time required to fully lift the outer boom 28 during a stacking operation.

The construction of the stacker 10 permits the positions of the first and second conveyors 14,16 to be changed without repositioning the stacker. Specifically, since the swing arm 20 and pick-up head 22 are pivotally mounted to the vertical support column 18 about a vertical axis, they can be pivoted about an arc spanning nearly 360°. Thus, the pick-up head 22 can pick up objects from and stack objects to any position along the arc without repositioning the stacker 10.

The transducers 50, 74, and 116 and programmable controller monitor the operation of the moveable components of the stacker 10 during operation and maintain the correct positioning of the components. Specifically, the linear transducer 50 senses the actual vertical position of the outer boom 28; the rotary transducers 74,116 sense the actual rotational position of the swing arm 20 and pick-up head 22; and the pressure transducer monitors the pressure in the hydraulic cylinder 30. The programmable controller receives the proportional signals generated by these transducers and compares the actual, sensed positions of the components with the expected position. If any of the stacker components is out of position, the controller automatically compensates for the error. This provides a feed back loop for compensating or correcting errors in the position of the stacker during operation.

Although the invention has been described with reference to the preferred embodiment illustrated in the attached drawing figures, it is noted that equivalents may be employed and substitutions made herein without departing from the scope of the invention as recited in the claims.

Having thus described the preferred embodiment of the invention, what is claimed as new and desired to be protected by letters patent includes the following:

I claim:

1. A stacker for picking up objects from a first location and stacking the objects in a second location, the stacker comprising:
   a vertically extending support column;
   a horizontally extending swing arm operably coupled with the support column for swinging movement about a vertical axis, the swing arm including an inner arm section pivotally mounted adjacent the support column about the vertical axis and an outer, breakaway arm section pivotally mounted to the inner arm section about a horizontally extending axis; and
   a pick-up head operably coupled with the end of the swing arm and including means for picking up the objects from the first location and stacking the objects in the second location.

2. The stacker as set forth in claim 1, further including a first rotary actuator mounted to the support column and operably coupled with the inner arm section for pivoting the swing arm about the vertical axis.

3. The stacker as set forth in claim 2, wherein the pick-up head is rotatably mounted below the distal end of the swing arm about a vertical axis.

4. The stacker as set forth in claim 3, further including a second rotary actuator mounted to the distal end of the swing arm and operably coupled with the pick-up head for rotating the pick-up head about its vertical axis.

5. The stacker as set forth in claim 4, further including a hydraulic controller for controlling the operation of the hydraulic cylinder and the first and second rotary actuators.

6. The stacker as set forth in claim 5, further including a first transducer coupled with the first rotary actuator for monitoring the pivoting of the swing arm and a second transducer coupled with the second rotary actuator for monitoring the rotation of the pick-up head.

7. The stacker as set forth in claim 6, further including a controller responsive to the first and second transducers for controlling the hydraulic controller.

8. The stacker as set forth in claim 1, the support column including a first stationary boom configured for attachment to a floor and a second extendable boom coupled with the first boom and shiftable between a raised, extended position and a lowered, retracted position.

9. The stacker as set forth in claim 8, the first stationary boom comprising an inner boom, the second extendable boom comprising a hollow outer boom telescopically received over the inner boom.

10. The stacker as set forth in claim 9, the support column further including a plurality of elongated guide rails mounted along the length of the interior of the outer boom and a plurality of wheels rotatably mounted to the exterior of the inner boom for rolling along the length of the guide rails during shifting of the outer boom between its extended and retracted positions.

11. The stacker as set forth in claim 9, the support column further including a plurality of elongated guide rails mounted along the length of the exterior of the inner boom and a pair of roller bars rotatably mounted to the outer boom for rolling along the length of the guide rails during shifting of the outer boom between its extended and retracted positions.

12. The stacker as set forth in claim 8, the support column further including a hydraulic cylinder operably coupled between the first and second booms for shifting the second boom between its extended and retracted positions.

13. A stacker for picking up objects from a first location and stacking the objects in a second location, the stacker comprising:
   a vertically extending support column including
      a first stationary boom configured for attachment to a floor,
      a second extendable boom coupled with the first boom and shiftable between a raised, extended position and a lowered, retracted position, and
      a hydraulic cylinder operably coupled between the first and second booms for shifting the second boom between its extended and retracted positions;
   a horizontally extending swing arm operably coupled with the support column for swinging movement about a vertical axis, the swing arm including an inner arm section pivotally mounted adjacent the support column about the vertical axis and an outer, breakaway arm section pivotally mounted to the inner arm section about a horizontally extending axis; and
   a pick-up head operably coupled with the end of the swing arm and including means for picking up the objects from the first location and stacking the objects in the second location.

14. The stacker as set forth in claim 13, the first stationary boom comprising an inner boom, the second extendable boom comprising a hollow outer boom telescopically received over the inner boom.

15. The stacker as set forth in claim 14, the support column further including a plurality of elongated guide rails mounted along the length of the interior of the outer boom and a plurality of wheels rotatably mounted to the exterior of the inner boom for rolling along the length of the guide rails during shifting of the outer boom between its extended and retracted positions.

16. The stacker as set forth in claim 15, the support column further including a plurality of elongated guide rails mounted along the length of the exterior of the inner boom and a pair of roller bars rotatably mounted to the outer boom for rolling along the length of the guide rails during shifting of the outer boom between its extended and retracted positions.

17. The stacker as set forth in claim 13, further including a first rotary actuator mounted to the support column and operably coupled with the inner arm section for pivoting the swing arm about the vertical axis.

18. The stacker as set forth in claim 13, wherein the pick-up head is rotatably mounted below the distal end of the swing arm about a vertical axis.

19. The stacker as set forth in claim 18, further including a rotary actuator mounted to the distal end of the swing arm and operably coupled with the pick-up head for rotating the pick-up head about its vertical axis.

20. A stacker for picking up objects from a first location and stacking the objects in a second location, the stacker comprising:

a vertically extending support column including a first stationary inner boom configured for attachment to a floor and a second, hollow, extendable boom telescopically received over the first boom and shiftable between a raised, extended position and a lowered, retracted position, the first and second booms being of approximately the same length so that the second boom substantially covers the first boom when the second boom is in its lowered, retracted position;

a horizontally extending swing arm operably coupled with the support column for swinging movement about a vertical axis; and a pick-up head operably coupled with the end of the swing arm and including means for picking up the objects from the first location and stacking the objects in the second location.

21. The stacker as set forth in claim 20, the support column further including a hydraulic cylinder positioned within the second boom and operably coupled between the first and second booms for shifting the second boom between its extended and retracted positions.

\* \* \* \* \*